United States Patent
Eismark et al.

(10) Patent No.: US 12,442,347 B2
(45) Date of Patent: Oct. 14, 2025

(54) PISTON AND AN INTERNAL COMBUSTION ENGINE SYSTEM

(71) Applicant: VOLVO TRUCK CORPORATION, Gothenburg (SE)

(72) Inventors: Jan Eismark, Gothenburg (SE); Tommy Simonsson, Stenungsund (SE); Rickard Ehleskog, Hisings Backa (SE); Gustavo Hindi, Surte (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/718,339

(22) PCT Filed: Dec. 17, 2021

(86) PCT No.: PCT/EP2021/086558
§ 371 (c)(1),
(2) Date: Jun. 10, 2024

(87) PCT Pub. No.: WO2023/110130
PCT Pub. Date: Jun. 22, 2023

(65) Prior Publication Data
US 2025/0043745 A1    Feb. 6, 2025

(51) Int. Cl.
*F02F 3/26* (2006.01)
*F02D 19/02* (2006.01)
*F02M 21/02* (2006.01)

(52) U.S. Cl.
CPC .............. *F02F 3/26* (2013.01); *F02D 19/021* (2013.01); *F02M 21/0206* (2013.01); *F02M 21/0248* (2013.01)

(58) Field of Classification Search
CPC ............ F02M 21/0248; F02M 21/0206; F02D 19/021; F02F 3/26
See application file for complete search history.

(56) References Cited

U.S. PATENT DOCUMENTS

| | | | |
|---|---|---|---|
| 5,215,052 A | 6/1993 | Augustin | |
| 5,720,253 A * | 2/1998 | Matoba | F02F 3/26 123/301 |

(Continued)

FOREIGN PATENT DOCUMENTS

| | | |
|---|---|---|
| BE | 563201 A | 12/1957 |
| DE | 102006029754 B4 | 12/2012 |

(Continued)

OTHER PUBLICATIONS

International Search Report and Written Opinion of the International Searching Authority in corresponding International Application No. PCT/EP2021/086558 mailed Jul. 28, 2022 (12 pages).

(Continued)

*Primary Examiner* — Kevin A Lathers
(74) *Attorney, Agent, or Firm* — Venable LLP; Jeffri A. Kaminski

(57) ABSTRACT

A piston for an internal combustion engine operable on a gaseous fuel is provided. The piston has a piston top end comprising a piston bowl for receiving at least one gaseous fuel jet from a fuel injector of the ICE, said piston bowl having a bottom section and a circumferential side section extending in an axial direction between the bottom section and a piston top end surface, wherein said bottom section comprises a protrusion segment configured to guide said at least one gaseous fuel jet. The protrusion segment further extends between spaced apart regions of the circumferential side section.

22 Claims, 6 Drawing Sheets

(56) References Cited

U.S. PATENT DOCUMENTS

| | | | |
|---|---|---|---|
| 6,725,828 B1* | 4/2004 | Han | F02F 1/4214 |
| | | | 123/285 |
| 8,459,229 B2 | 6/2013 | Rothbauer et al. | |
| 11,415,083 B1* | 8/2022 | Kavuri | F02B 41/06 |
| 11,828,220 B1* | 11/2023 | Zhang | F02B 19/12 |
| 2003/0024246 A1 | 2/2003 | Beck et al. | |
| 2005/0257769 A1 | 11/2005 | Li et al. | |
| 2006/0180105 A1* | 8/2006 | Springer | F02B 33/22 |
| | | | 123/70 V |
| 2009/0012698 A1 | 1/2009 | Shinagawa et al. | |
| 2009/0043479 A1* | 2/2009 | Noda | F02D 19/0671 |
| | | | 123/304 |
| 2010/0258076 A1 | 10/2010 | Eismark et al. | |
| 2012/0160221 A1 | 6/2012 | Munshi et al. | |
| 2012/0255520 A1 | 10/2012 | Grover et al. | |
| 2014/0311837 A1 | 10/2014 | Mercure | |
| 2015/0308362 A1 | 10/2015 | Dunn et al. | |
| 2015/0308371 A1 | 10/2015 | Eismark | |
| 2016/0348571 A1 | 12/2016 | Huang et al. | |
| 2019/0003372 A1 | 1/2019 | Eismark | |
| 2019/0048812 A1 | 2/2019 | Lundgren | |
| 2021/0025351 A1 | 1/2021 | Primus et al. | |
| 2022/0154654 A1 | 5/2022 | Andersson et al. | |

FOREIGN PATENT DOCUMENTS

| | | | |
|---|---|---|---|
| DE | 102015005469 A1 | | 11/2016 |
| DE | 102017219583 A1 | | 5/2019 |
| DE | 102019209232 A1 | | 12/2020 |
| JP | H5296045 A | | 11/1993 |
| JP | 2005330915 A | * | 12/2005 |
| WO | 03064831 A1 | | 8/2003 |
| WO | 2006058596 A1 | | 6/2006 |
| WO | 2017108103 A1 | | 6/2017 |

OTHER PUBLICATIONS

International Search Report and Written Opinion of the International Searching Authority in corresponding International Application No. PCT/EP2021/086533 mailed Aug. 11, 2022 (14 pages).

International Search Report and Written Opinion of the International Searching Authority in corresponding International Application No. PCT/EP2021/086564 mailed Aug. 25, 2022 (15 pages).

Non Final Office Action dated Dec. 16, 2024 in corresponding U.S. Appl. No. 18/719,671, 9 pages.

Final Office Action dated Apr. 3, 2025 in corresponding U.S. Appl. No. 18/719,665, 13 pages.

Non Final Office Action dated Dec. 12, 2024 in corresponding U.S. Appl. No. 18/719,665, 11 pages.

Final Office Action dated Jun. 17, 2025 in corresponding U.S. Appl. No. 18/719,671, 11 pages.

Notice od Allowance dated Aug. 27, 2025 in corresponding U.S. Appl. No. 19/719,665, 8 pages.

* cited by examiner

PISTON AND AN INTERNAL COMBUSTION ENGINE SYSTEM

CROSS-REFERENCE TO RELATED APPLICATIONS

This application is a U.S. National Stage application of International Application No. PCT/EP2021/086558, filed Dec. 17, 2021 and published on Jun. 22, 2023 as WO 2023/110130, all of which is hereby incorporated by reference in its entirety.

TECHNICAL FIELD

The present disclosure relates to a piston for an internal combustion engine. The present disclosure further relates to an internal combustion engine system for a vehicle, wherein the internal combustion engine comprises a piston. The disclosure is applicable on vehicles, in particularly heavy-duty vehicles, such as e.g. trucks. However, although the present disclosure will mainly be described in relation to a truck, the internal combustion engine system may also be applicable for other types of vehicles propelled by means of an internal combustion engine. In particular, the present disclosure can be applied in heavy-duty vehicles, such as trucks, buses and construction equipment, but also in cars and other light-weight vehicles etc. Further, the internal combustion engine is typically a hydrogen internal combustion engine.

BACKGROUND

For many years, the demands on internal combustion engines have been steadily increasing. By way of example, reducing exhaust gases, increasing engine efficiency, reducing fuel consumption, and lowering noise level from the engines are some of the criteria that have become more important when designing an internal combustion engine (ICE) system for a heavy-duty vehicle. At least for these reasons, the components of the ICE systems have been continuously developed to meet the various demands from the market. In particular, the ICE system may generally need to be developed in view of both prevailing and expected future environmental regulations such as restrictions relating to maximum allowable amount of exhaust gas pollution. These environmental regulations are particularly relevant for heavy-duty vehicles, such as trucks.

One type of ICE system that may have the potential to meet prevailing and future environmental regulations is a hydrogen ICE system in which the combustion of hydrogen with oxygen produces water vapour as a main exhaust product. In such hydrogen ICE system, hydrogen fuel is supplied to the combustion cylinder in gaseous form and subsequently blended with compressed air so as to provide an appropriate mixture of hydrogen and air in the combustion cylinder when performing and completing the combustion reaction.

It would be desirable to improve the operation of ICE systems for combustion of gaseous fuel, such as an ICE system operable on hydrogen gas. In addition, it would be desirable to further improve the control of the combustion process in hydrogen piston ICE systems for heavy-duty vehicles. In particular, it would be desirable to provide a piston intended for gaseous fuel ICE system.

SUMMARY

An object of the disclosure is to provide an enhanced piston design intended for operating in a fuel gas internal combustion engine system, in which the mix of gaseous fuel with compressed air can be further improved so as to provide a more efficient ICE system. The object is at least partly achieved by a piston according to claim 1. The object is at least partly achieved by an internal combustion engine system according to claim 5. The object is also at least partly achieved by the other independent claims. The dependent claims relate to advantageous embodiments.

According to a first aspect of the disclosure, there is provided a piston for an internal combustion engine, ICE, operable on a gaseous fuel. The piston has a piston top end comprising a piston bowl for receiving at least one gaseous fuel jet from a fuel injector of the ICE. The piston bowl has a bottom section and a circumferential side section extending in an axial direction between the bottom section and a piston top end surface. Moreover, the bottom section comprises a protrusion segment configured to guide the at least one gaseous fuel jet. The protrusion segment further extends between spaced apart regions of the circumferential side section.

By using a piston having a piston bowl with a protrusion segment extending between spaced apart regions of the circumferential side section and further configured to guide the one or more gaseous fuel jets, it becomes possible to make use of the protrusion segment to improve the mixing of hydrogen gas and compressed air prior to the ignition event. The mixing may here generally refer to the mixing of the hydrogen gas and trapped cylinder gas during the hydrogen gas injection period and thereafter during the compression stroke. The trapped cylinder gas may contain compressed air, but also EGR-gases.

The protrusion segment can be provided in several different geometries, shapes and disposed at various location along the bottom section of the piston bowl. By way of example, the protrusion segment is an essentially straight protrusion segment. A straight shape of the protrusion segment may be beneficially for the manufacturing of the piston.

In addition, or alternatively, the protrusion segment may be a diameter protrusion segment extending through a centre of the piston bowl. An advantage with a central location of the protrusion segment is that the diameter protrusion segment allows to use symmetry-effects. By way of example, assuming a fuel injector controllable to inject a central jet, such central jet would interact in an equal manner on both sides of the central protrusion segment, while injecting two jets would approach and interact with the protrusion segment in an equal manner.

In addition, or alternatively, the protrusion segment may be a chord protrusion segment arranged offset the centre of the piston bowl. An offset protrusion segment may be advantageous for certain types of arrangements of the fuel injector and an optional ignition source in the cylinder.

According to a second aspect of the disclosure, there is provided an internal combustion engine, ICE, system. The ICE system comprises an internal combustion engine for combustion of gaseous fuel and having a combustion chamber at least partially delimited by a cylinder. The ICE system further comprises a piston according to the first aspect and/or any one of above features and embodiments of the first aspect. The piston is moveable within the cylinder between a bottom dead centre BDC and a top dead centre TDC. The piston bowl is intended to form part of the combustion chamber. The ICE system further comprises a controllable fuel injector arranged to inject gaseous fuel into the combustion chamber and towards the piston bowl. Further, the ICE system comprises a controller configured to control the controllable fuel injector to inject at least one gaseous fuel jet towards the bottom section of the piston bowl during a fuel injection period occurring prior to an ignition event of the gaseous fuel Effects and features of this second aspect of the present disclosure are largely analogous to those described above in connection with the first aspect of the disclosure. Embodiments mentioned in relation to the first aspect of the present disclosure are largely compatible with the second aspect of the disclosure.

In particular, by the proposed piston according to the first aspect and the proposed ICE system according to the second aspect, it becomes possible to guide the fuel-jets by re-directing the fuel-jets primarily upwards, i.e. in the direction the piston travels to reach TDC, in a more controlled manner, at least in comparison with other conventional piston designs without the protrusion segment.

By providing a controllable fuel injector in combination with the proposed piston, it further becomes possible to make use of a certain piston bowl design in gaseous fuel ICE systems so as to improve the mixing prior to the ignition event.

The present disclosure is based on the insight that one of many challenges in providing reliable hydrogen internal combustion engine systems is the interplay between fuel injection and mixing of fuel and compressed air within the combustion chamber. By the proposed ICE system, it becomes possible to improve the mixing of hydrogen fuel prior to combustion of the fuel in the combustion chamber of the ICE. As such, the proposed ICE system facilitates the interplay between injector configuration, ambient conditions, and combustion.

While the present disclosure may be used in any type of fuel gas ICE system that includes the proposed piston, the present disclosure is particularly useful for a hydrogen internal combustion system. Hence, according to at least one embodiment, the ICE system is a hydrogen ICE system. In addition, hydrogen can be combusted in an internal combustion engine over a wide range of fuel-air mixtures. While a hydrogen ICE system may be operated to produce low emissions during certain conditions, the amount of NOx emission may at least partly depend on the air/fuel ration, the engine geometrical compression ratio as well as the engine speed and the ignition timing. It may be noted that also the amount of recirculated exhaust (EGR) has an impact of the NOx emission. In addition, combustion of air/fuel in a hydrogen ICE system may pose higher demands on the strength and size of the engine components compared to e.g. a traditional gasoline engine. Accordingly, the prevailing combustion conditions for hydrogen combustion are different compared to gasoline ICE systems.

In particular, the proposed ICE system is suitable for spark-ignited internal combustion engines, utilizing hydrogen direct injection so as to achieve high engine power output and efficiency with low emissions. One of the many advantages of using hydrogen in ICE systems as a clean alternative fuel is its zero-carbon content. This means that carbon-based emissions, mainly CO, $CO_2$, HC and soot, can be eliminated, leaving NOx as the only harmful combustion by-product.

The controller may be configured to control the controllable fuel injector to inject at least one gaseous fuel jet towards the bottom section of the piston bowl during the fuel injection period when the reciprocating piston moves from BDC to TDC during a compression stroke.

The controller may be configured to control the fuel injector to inject at least one gaseous fuel jet during the compression stroke when the reciprocating piston travels from BDC to a piston position corresponding to 90 crank angle degrees, CAD, before the TDC.

The fuel injection period may be initiated by the controllable fuel injector when the piston is at any one of a position being a piston position before BDC during an intake stroke, a piston position at the BDC and a piston position after the BDC during the compression stroke.

The controllable fuel injector may be configured to inject at least one gaseous fuel jet towards the protrusion segment, whereby the protrusion segment is configured to guide the at least one gaseous fuel outwardly and towards the circumferential side section. Hereby, the protrusion segment is configured to guide the at least one gaseous fuel outwardly in the radial direction of the piston bowl and towards the circumferential side section, which is located radially outwardly from the protrusion segment.

The controllable fuel injector may be configured to inject at least one gaseous fuel jet towards the circumferential side section, whereby the circumferential side section is configured to guide at least one gaseous fuel jet inwardly and towards the protrusion segment. The protrusion segment may further be capable of directing the guided gaseous fuel jet upwardly along the centre axis. In particular, the circumferential side section is configured to guide at least one gaseous fuel jet inwardly in the radial direction of the piston bowl and thus towards the protrusion segment. When the gaseous fuel jet then interacts with the protrusion segment, the gaseous fuel is directed upwardly in the axial direction due to the arrangement of the protrusion segment.

Favourably, the above configurations of injecting gaseous fuel jet(s) during the fuel period may be combined during one fuel injection period. In other words, in one example embodiment, the controllable fuel injector may be configured to inject, during the fuel injection period, one or more gaseous fuel jets towards the protrusion segment at a first piston position and one or more gaseous fuel jets towards the circumferential side section at a second piston position.

The controller may be configured to control the fuel injector in response to a control signal. The controller may be configured to control the fuel gas injection arrangement in response to a control signal containing data being indicative of a hydrogen system pressure, a number of injections per engine cycle, a timing for start of each injection, a duration of each injection, a separation time between injections.

The internal combustion engine may further comprise an ignition source comprising a spark plug for igniting the gaseous fuel.

The fuel injection period may be terminated by the controllable fuel injector prior to ignition of the fuel by the ignition source.

The fuel injector may be controllable by the controller to inject the at least one gaseous fuel jet in form of an under-expanded jet.

According to one embodiment, the ICE operates in a four-stroke configuration. In other embodiments, the ICE operates in a two-stroke configuration. In other embodiments, the ICE operates in an eight-stroke configuration.

The fuel injector may be controllable by the controller to inject a number of gaseous fuel jets during the compression stroke.

The controllable fuel injector may comprise a nozzle device configured to form the at least one gaseous fuel jet from a gaseous fuel delivered to the fuel injector from a fluid conduit.

The nozzle device may comprise a cap device arranged at an end of the nozzle device. The cap device may comprise at least one orifice for directing the at least one gaseous fuel jet towards the piston bowl. By way of example, the orifice is an essentially circular orifice for directing the at least one gaseous fuel jet towards the piston bowl.

The controllable fuel injector may be controllable to inject gaseous fuel into the combustion chamber with a given injection pressure. Preferably, the controllable fuel injector may be controllable to inject gaseous fuel into the combustion chamber with a low injection pressure.

Still preferably, the controllable fuel injector may be controllable to inject gaseous fuel into the combustion chamber with a low injection pressure of not more than 60 bar. Accordingly, the controllable fuel injector may be controllable by the controller to inject gaseous fuel into the combustion chamber with a low injection pressure of not more than about 60 bar. This maximum injection pressure of 60 bar generally corresponds to the conditions of a so called low pressure direct injection ICE system. Hence, according to one example embodiment, the internal combustion engine may be a low pressure direct injection fuel gas ICE.

However, the gaseous fuel may for other ICE systems be injected with a higher injection pressure. By way of example, the controllable fuel injector may be controllable to inject gaseous fuel into the combustion chamber with an injection pressure of about 100 bar. In other applications, the controllable fuel injector may be controllable to inject gaseous fuel into the combustion chamber with an injection pressure of about 350 bar. In yet other applications, the controllable fuel injector may be controllable to inject gaseous fuel into the combustion chamber with an injection pressure of about 500 bar. Accordingly, the controllable fuel injector may be controllable to inject gaseous fuel into the combustion chamber with an injection pressure of not more than 500 bar.

The controllable fuel injector may be controllable by the controller to inject gaseous fuel into the combustion chamber with a velocity of up to about 1600 m/s. In one example embodiment, the controllable fuel injector is controllable by the controller to inject gaseous fuel into the combustion chamber with a velocity of about 1600 m/s.

The fuel may typically be hydrogen. The hydrogen can be stored in a fuel tank. The hydrogen can be stored in gaseous form or partly in liquid form. The hydrogen is generally supplied to the fuel injector in gaseous form.

According to at least a third aspect of the present disclosure, the object is achieved by a vehicle according to claim 22. The vehicle comprises a piston according to the first aspect of the disclosure. In addition, or alternatively, the vehicle comprises an internal combustion engine system according to the second aspect of the disclosure.

Effects and features of this third aspect of the present disclosure are largely analogous to those described above in connection with the first and second aspects of the disclosure. Embodiments mentioned in relation to the third aspect of the present disclosure are largely compatible with the first and second aspects of the disclosure.

In addition, there is provided a method for controlling an internal combustion engine, ICE, system, the ICE system comprising an internal combustion engine for combustion of gaseous fuel and having a combustion chamber at least partially delimited by a cylinder, a reciprocating piston moveable within the cylinder between a bottom dead centre BDC and a top dead centre TDC, the reciprocating piston having a piston top end comprising a piston bowl intended to form part of the combustion chamber, the piston bowl further having a bottom section and a circumferential side section extending in an axial direction between the bottom section and a piston top end surface, wherein the bottom section comprising a protrusion segment configured to guide the one or more gaseous fuel jets, and wherein the protrusion segment further extends between spaced apart regions of the circumferential side section, and a controllable fuel injector arranged to inject gaseous fuel into the combustion chamber and toward the piston bowl. The method comprises controlling the fuel injector to inject at least one gaseous fuel jet towards the bottom section of the piston bowl during a fuel injection period occurring prior to an ignition event of the gaseous fuel. Optionally, the method may comprise monitoring the position of the piston in the cylinder. Further, the method may comprise terminating the injection of one or more gaseous fuel jets prior to controlling the ignition source to ignite the supplied hydrogen gas within the combustion chamber. The method can be executed in several different manners. According to one example embodiment, the steps of the method are performed by the controller during use of the ICE system of the vehicle. According to one example embodiment, the steps of the method are performed in sequence. However, at least some of the steps of the method can be performed in parallel.

Further advantages and advantageous features of the disclosure are disclosed in the following description and in the dependent claims. It should also be readily appreciated that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein:

FIG. 2.

DETAILED DESCRIPTION OF EXAMPLE EMBODIMENTS

Figure 1:
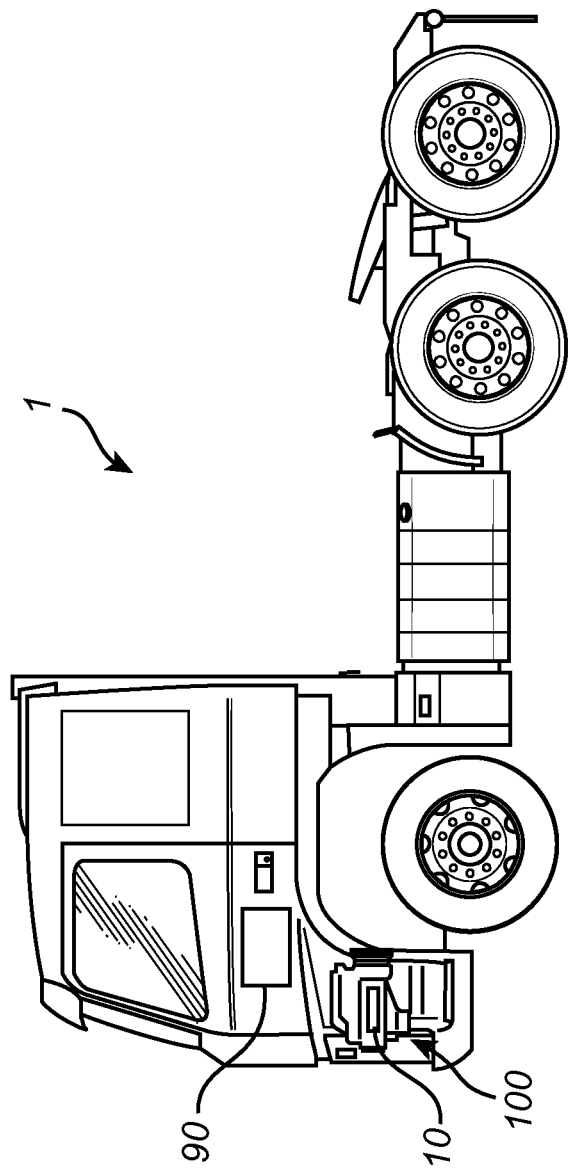
FIG. 1 is a side view of a vehicle comprising an internal combustion engine (ICE) system according to an example embodiment of the present disclosure.

The present disclosure will now be described more fully hereinafter with reference to the accompanying drawings, in which an exemplary embodiment of the disclosure is shown. The disclosure may, however, be embodied in many different forms and should not be construed as limited to the embodiment set forth herein; rather, the embodiment is provided for thoroughness and completeness. Like reference character refer to like elements throughout the description.

With particular reference to FIG. 1, there is provided a vehicle 1 in the form of a truck. The vehicle 1 comprises an internal combustion engine, ICE, system 100 for powering and driving the vehicle 1. The ICE system 100 in FIG. 1 also comprises an ICE 10. The ICE 10 is intended for combustion of hydrogen gaseous fuel. In particular, the ICE system 100 is a hydrogen piston ICE system. The combustion in such hydrogen ICE system 100 is based on a combustion of air and hydrogen, as is commonly known in the art. While the combustion of hydrogen with oxygen may only produce water as its only product in a pure combustion process between hydrogen and oxygen, a hydrogen ICE system 100 based on combustion of air and hydrogen generally produce water, heat and NOx, as is commonly known in the art. In addition, hydrogen can be combusted in an internal combustion engine over a wide range of fuel-air mixtures.

The hydrogen ICE system may be operated to produce very low emissions during certain conditions. The hydrogen ICE system 100 is here operated based on hydrogen gas.

The truck 1 is here a vehicle with a single propulsion system where traction power is provided by the hydrogen piston ICE system 100. However, the truck may likewise be a hybrid electric vehicle. By way of example, the hybrid electric vehicle comprises a supporting electric propulsion system having at least one high-voltage battery and at least one electric machine, and further the hydrogen ICE system 100.

Figure 6:
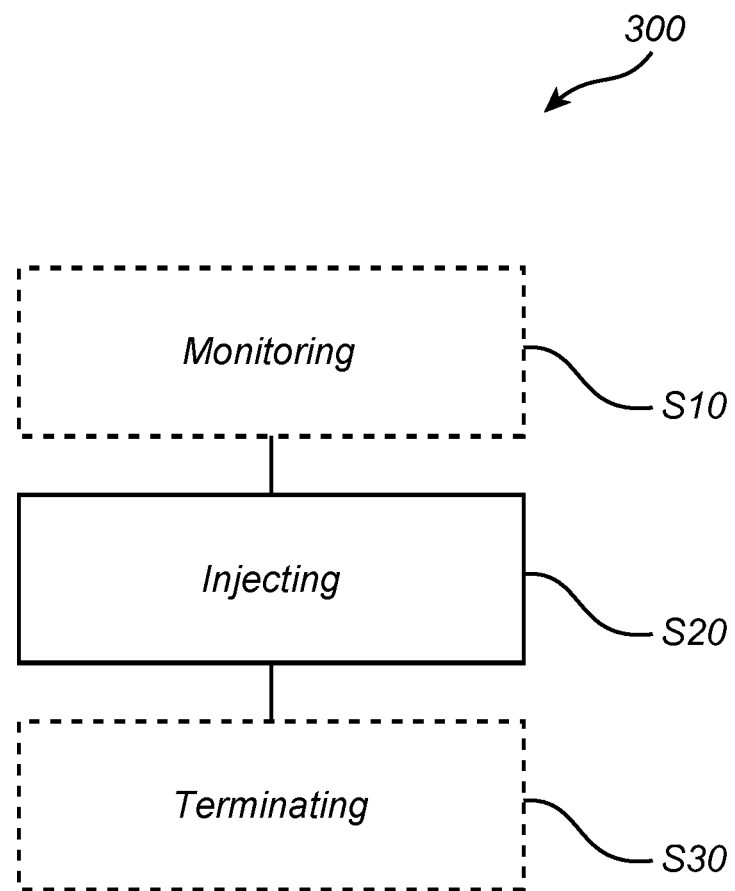
FIG. 6 is a flow-chart of a method according to an example embodiment of the present disclosure, in which the method comprises a number of steps for controlling the ICE system in e.g.

As depicted in FIG. 1, the ICE system 100 further comprises a control unit 90, herein also denoted as a controller. The controller 90 is here an integral part of a main electronic control unit for controlling the vehicle and various parts of the vehicle. The controller 90 is arranged in communication with the components of the ICE system 100, in particular the ICE 10. As will be further described herein, the controller 90 is configured to control a controllable fuel injector to inject at least one gaseous fuel jet towards a piston during a fuel injection period. The controller 90 may also be a separate part of the vehicle 1 and communicate with the main electronic control unit for controlling the vehicle and various parts of the vehicle. As will be further described in relation to FIG. 6, the controller 90 is configured to perform any one of a number of steps of a method for controlling fuel injection of hydrogen gas in relation to the position of the components, such as a reciprocating piston, of the ICE system 100.

Figure 2:
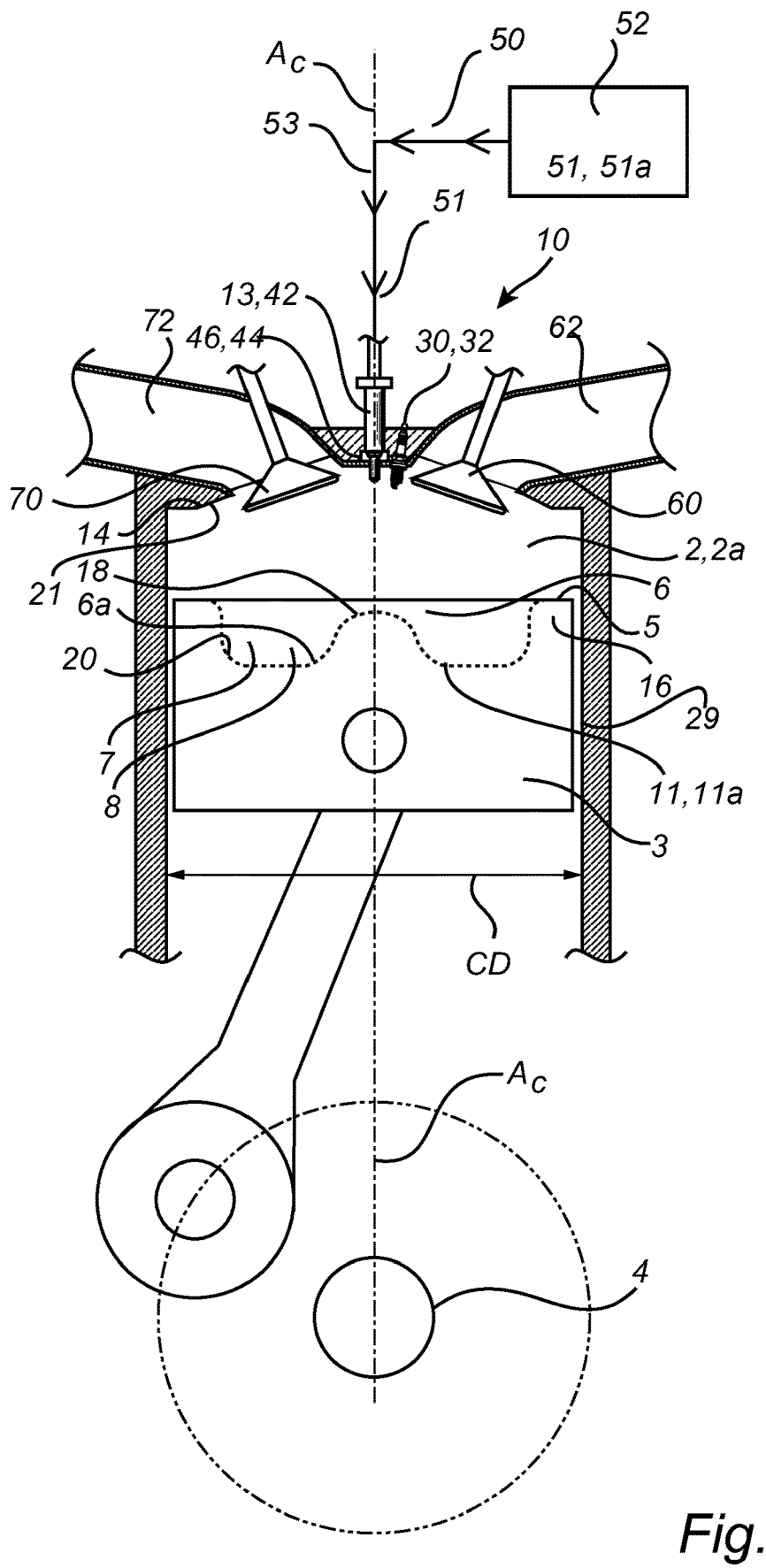
FIG. 2 is a side view of a cylinder and a reciprocating piston of an ICE system according to an example embodiment of the present disclosure.

Turning now to FIG. 2, there is depicted one example embodiment of the ICE system 100 for incorporation in the vehicle 1 as described above in relation to FIG. 1. In particular, FIG. 2 is a perspective cross-sectional view of parts of a hydrogen gas piston internal combustion engine according to example embodiments of the disclosure. As illustrated in FIG. 2, the ICE 10 comprises at least one cylinder 2. In addition, the ICE 10 has at least one combustion chamber 7 at least partially delimited by the cylinder 2. Moreover, the hydrogen ICE 10 comprises a piston 3 as disclosed herein, e.g. in FIGS. 2 and 3. Other examples of suitable pistons 3 for incorporation in the ICE 10 and ICE system 100 in FIG. 2 are described in relation to FIGS. 4 and 5A to 5C. The piston 3 is arranged and configured to reciprocate inside the cylinder 2. The piston 3 is arranged to reciprocate inside the cylinder such that the ICE is operated to combust hydrogen gas fuel, whereby the motion of the piston 3 reciprocating in the cylinder 2 is transmitted to a rotational movement of a crank shaft 4, as shown in FIG. 2. The ICE system 100 thus comprises the crankshaft 4.

It is to be noted that while FIG. 2 only depicts a single cylinder 2 having the combustion chamber 7 and the reciprocating piston 3 arranged therein, the ICE 10 generally comprises a plurality of cylinders 2 operated to combust hydrogen gas fuel, whereby the motions of the pistons 3 reciprocating in the cylinders 2 are transmitted to a rotational movement of the crank shaft 4. The crank shaft 4 is further coupled to a transmission (not shown) for providing a torque to driving elements. In case of a heavy-duty vehicle, such as a truck, the driving elements are wheels; however, the ICE system 10 may also be used for other equipment such as construction equipment, marine applications, etc.

Generally, each cylinder 2 is provided with a corresponding piston 3 connected to the crankshaft 4 of the ICE 10. As illustrated in FIG. 2, the piston 3 is arranged in the cylinder 2 for reciprocal movement along a central axis $A_c$. The piston 3 is mechanically connected to the crankshaft 4 of the ICE 10, so that the piston 3 is movable in the cylinder 2 between an upper dead centre position and a lower dead centre position. The piston 3 thus reciprocates in the cylinder 2 and is connected to the crankshaft 4 so that the piston 3 is set to reverse in the cylinder 2 at the upper and lower dead centre positions. The upper dead centre position is denoted as the top dead centre, TDC, and the lower dead centre position is denoted as the bottom dead centre, BDC, as illustrated by the arrows in FIG. 2.

Figure 3:
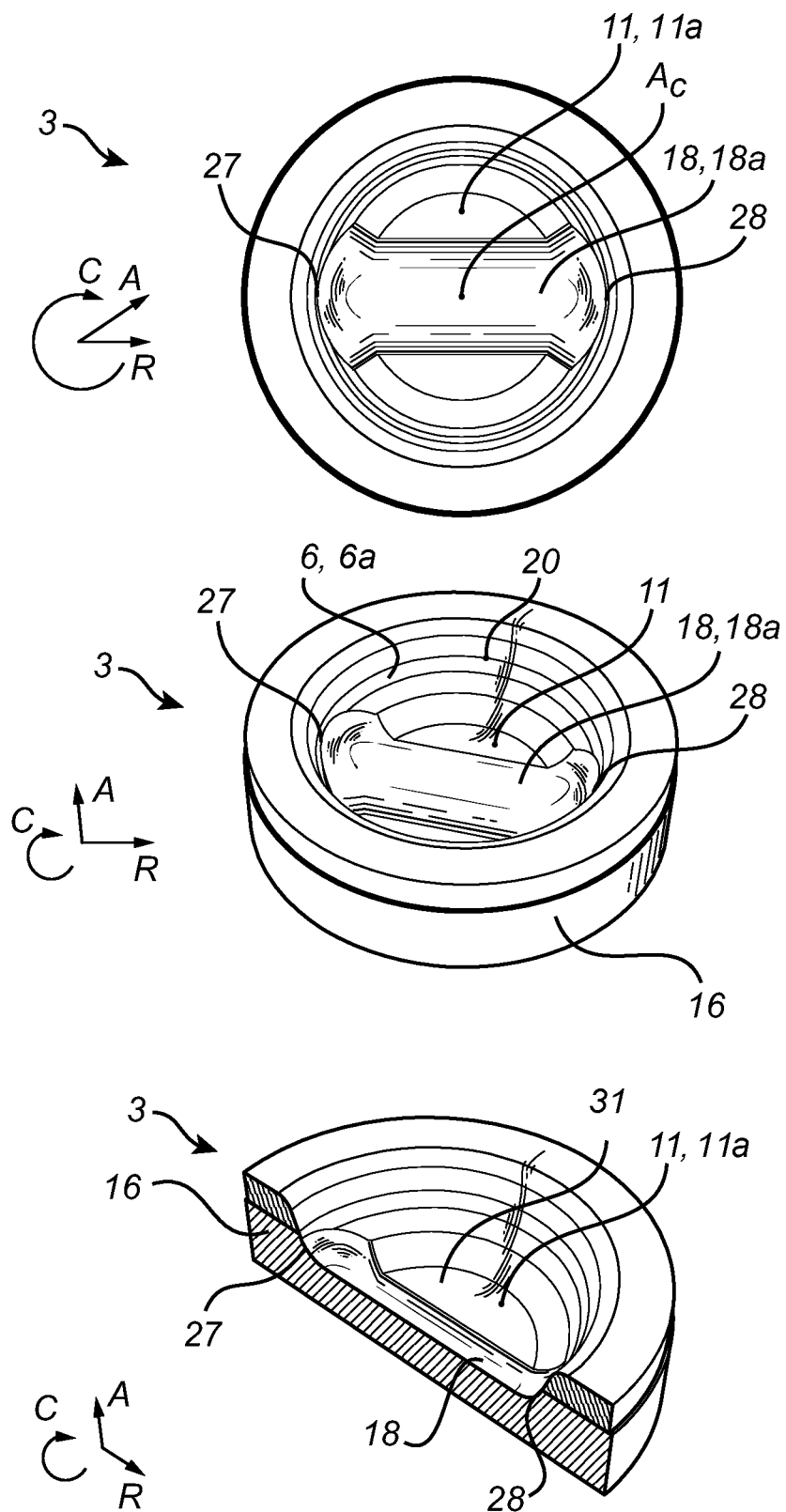
FIG. 3 conceptually illustrate one example embodiment of a piston design for the ICE system in FIG. 2, according to the disclosure.

As also illustrated in e.g. FIG. 2, and further in the other Figures, such as FIGS. 3, the piston 3 extends in an axial direction A and in a radial direction R. The piston 3 has a diameter that is less than an inner diameter of the cylinder CD, as shown in FIG. 2. Further, the piston 3 has a circumferential extension along a circumferential direction C. The piston 3 also has a longitudinal centre axis Ac, which hereinafter is generally denoted as the axial centre axis. The axial centre axis Ac of the piston 3 is typically, although strictly not necessary, co-axially arranged with an axial centre axis of the fuel gas injector 13, as illustrated in FIG. 2. However, in some examples, the axial centre axis of the fuel gas injector 13 may be slightly offset the axial centre axis Ac of the piston 3.

As used herein, the terms "radial" or "radially" refer to the relative direction that is substantially perpendicular to an axial centreline of a particular component. Further, the term "longitudinal", "longitudinally", "axially" or "axial" refer to the relative direction that is substantially parallel and/or coaxially aligned to an axial centreline of a particular component. Also, the term "longitudinal", "longitudinally", "axially" or "axial" refer to a direction at least extending between axial ends of a particular component, typically along the arrangement or components thereof in the direction of the longest extension of the arrangement and/or components. The terms "vertical" and "vertically" generally correspond to the axial direction.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. Accordingly, in this context, the terms upstream and downstream are generally defined relative to the flow of fuel from a fuel tank 52 to the combustion chamber 7 of the cylinder 2, as illustrated in FIG. 2. Similarly, terms such as "upper", "above" and "top" as well as "lower", "bottom", "below" generally refer to the relative position of the part or component with respect to the axial direction.

Each one of the cylinders 2 defines at least partly a combustion chamber 7. Each one of the cylinders 2 comprises a cavity 2a defining an inner volume. One end of the cylinder cavity is closed by a cylinder head 14. Further, each one of the cylinders 2 has an inner circumferential side wall 29. In a similar vein, the cylinder head 14 has an inner surface 21. These parts together with a combustion chamber facing portion of the piston 3 generally defines the combustion chamber 7. It should be noted that the cylinder head may be provided in several different shapes, and thus not necessarily in the form of a so called pent-roof type, as illustrated in FIG. 2. By way of example, the cylinder head 14 may have an essentially flat bottom inner surface 21. Other examples of cylinder heads are also possible. In addition, the inner wall of the cylinder may be provided by a so called a cylinder liner, as is commonly known in the art.

By way of example, the reciprocating piston 3 comprises a piston top end 16. The piston top end is here a so called piston crown. The piston top end 16 comprises a piston bowl 6. The piston bowl 6 is thus arranged in an upper axial end portion of the piston 3, as illustrated in FIG. 2. The piston bowl 6 is arranged and intended to form part of the combustion chamber 7. As such, the piston bowl 6 is here the combustion chamber facing portion of the piston 3. In FIG. 2, there is depicted one example of providing the piston 3 with a piston bowl 6 at its piston top end 16, wherein a surface 6a of the piston bowl 6 is arranged to define the combustion chamber 7 with the cavity 2a of the cylinder. As such, as depicted in FIG. 2, the piston bowl surface 6a forms a combustion chamber 7 with the inner surface 21 of the cylinder head 14, and the circumferential side wall 29 of the cylinder 2.

Each cylinder 2 may further comprise at its vertical top end at least one and typically a multiple number of inlet channels having at least one inlet valve 70 for controlling a flow of the inlet air to the combustion chamber 7, and at least one and typically a multiple number of exhaust channels having a least one exhaust valve 60 for controlling discharge of exhaust gases produced from the fuel combustion process taking place within the cylinder 2.

In particular, in the cylinder head 14, one or more induction ports with corresponding inlet valves 70 are arranged. Accordingly, as depicted in FIG. 2, the ICE system 100 further comprises an intake manifold 72 forming one or more intake guides arranged to guide air to the cylinders 2. In a similar vein, in the cylinder head 14, one or more exhaust ports with corresponding exhaust valves 60 are arranged. Accordingly, as depicted in FIG. 2, the ICE system 100 further comprises an exhaust guide 62 arranged to guide gases from the cylinders 2.

The cylinder configuration may be e.g. straight, V-shaped or any other suitable kind. The ICE system 100 may also include additional engine components and system components.

Figure 5A:
FIGS. 5A to 5C conceptually illustrate yet another example embodiment of a piston design for the ICE system, according to the disclosure.
Figure 5B:
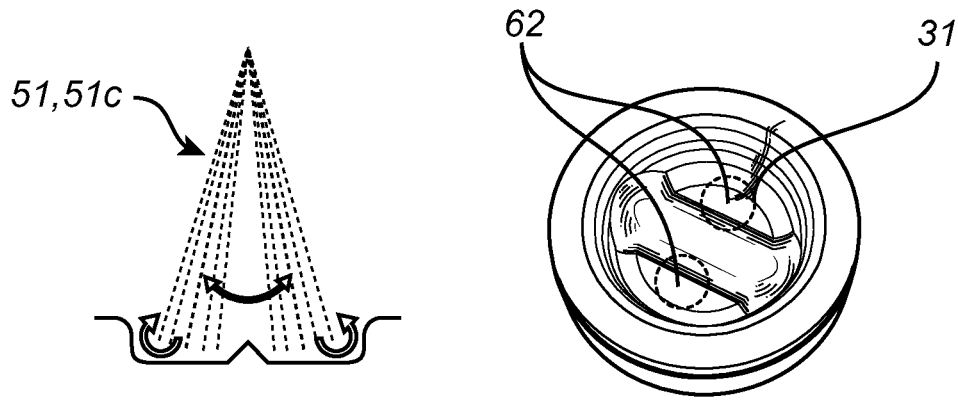
Figure 5C:
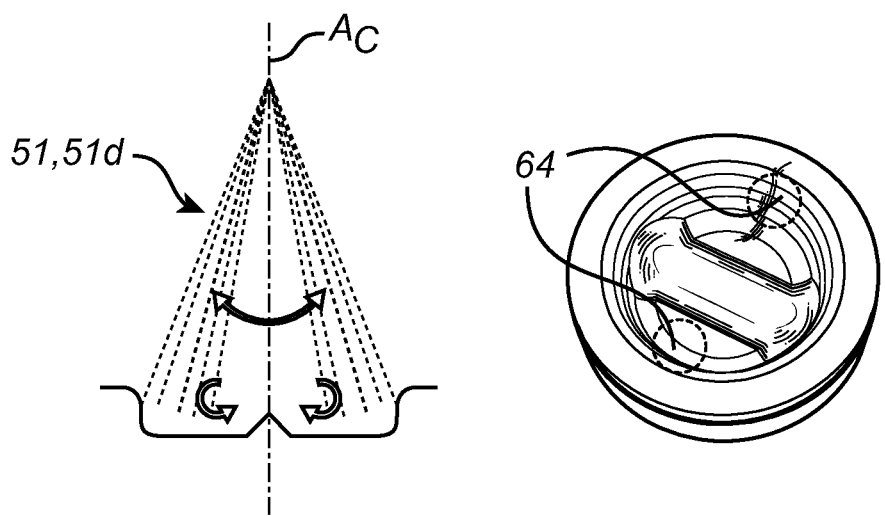

Moreover, in the cylinder head 14, there is disposed at least one fuel injector 13, through which gaseous fuel is injected into the cylinder 2 as fuel jets 51 (see FIGS. 5A to 5C). As such, the fuel injector 13 is arranged vertically into the centre of the roof of the combustion chamber 7.

The fuel injector 13 is configured to be controlled by the controller 90 (FIG. 1). Accordingly, the fuel injector is a controllable fuel injector 13. The controllable fuel injector 13 is arranged to inject hydrogen gas fuel. For hydrogen ICE systems, the hydrogen gas fuel is injected with a low injection pressure into the combustion chamber 7 and towards the piston bowl 6.

The fuel injector 13 is here controllable by the controller 90 to inject hydrogen gas into the combustion chamber 7 with a low injection pressure of between 15 to 60 bar. Generally, for a hydrogen directed injection ICE, the hydrogen gas is injected into the combustion chamber 7 with a low injection pressure of between 15 to 30 bar. However, for other ICE systems, the controllable fuel injector may be controllable to inject gaseous fuel into the combustion chamber with an injection pressure of up to about 500 bar.

The fuel injector 13 may be any suitable type of injector capable of injecting hydrogen gas. In general, the fuel injector 13 is arranged in the cylinder 2 and axially above the piston 3. The fuel injector 13 is typically centrally disposed in the cylinder head 14 so that a geometrical central axis A of the fuel injector 13 coincides with a geometrical central axis $A_c$ of the cylinder 2, which is also an axis of reciprocation of the piston 3.

The fuel injector 13 comprises at least one, preferably a plurality of injection orifices 46 for permitting the pressurized hydrogen gas to flow into the combustion chamber 7. The injected hydrogen gas will thereby provide kinetic energy into the combustion chamber 7, so as to induce thorough mixing of the hydrogen gas with the air contained therein. In order to enhance the mixing of hydrogen gas with air prior to ignition of the fuel in the combustion chamber 7, the piston 3 further comprises a piston bowl 6 according to any one of the examples illustrated in the FIGS. 3, 4 and 5A to 5C, and described hereinafter in more detail.

By the above arrangement, the fuel injector 13 is configured to admit hydrogen gas jets 51 into the combustion chamber 7. As such, the fuel injector 13 is situated directly at the combustion chamber 7 and in the cylinder head, whereby the fuel injector 13 is capable of directly injecting hydrogen gas jets 51 into the combustion chamber 7 and towards the piston 3.

One example of a controllable fuel injector 13 is a fuel injector with a nozzle device 42 configured to form the at least one hydrogen gas jet 51 from hydrogen fuel in gaseous form 51a. The hydrogen fuel is delivered to the fuel injector 13 from a hydrogen gas fluid conduit 53, as illustrated in FIG. 2. In this example, the nozzle device optionally comprises an end cap 44 arranged at an end of the nozzle device 42. The end cap 44 comprises the essentially circular orifice 46 for directing the hydrogen gas jet 51 towards the piston bowl 6. In other examples, the end cap 44 comprises a number of orifices 46 for directing the hydrogen gas jet 51 towards the piston bowl 6. The controllable fuel injector 13 may further be designed with an inner moveable valve arrangement (not illustrated) arranged inside the nozzle device to provide further control of the supply of the hydrogen gas into the combustion chamber 7. Fuel injectors with controllable valve arrangements can be provided in several different manners, e.g. in the form of poppet valves or pintle valves. These components are of conventional types and thus not further described herein.

In addition, the fuel injector 13 can be controllable by several different type of actuators, including, but not limited, to pneumatic actuation control, electronic actuation control, electro-mechanic actuation control, hydraulic actuation control, and a combination thereof.

As mentioned above, the fuel injector is connected and in fluid communication with the hydrogen gas fluid conduit 53. The hydrogen gas fluid conduit is generally a part of a hydrogen gas fuel system. Thus, as shown in FIG. 2, the ICE system 100 here further comprises a hydrogen gas fuel system 50. The hydrogen gas fuel system 50 defines the hydrogen fuel line 53 and is configured to supply hydrogen gas to the cylinder(s) 2 by means of the fuel injector(s) 13. Optionally, the fuel system 50 may include the plurality of fuel gas injectors 13. Alternatively, the fuel gas injectors 13 may be separate parts arranged in fluid communication with the fuel system 50. The number of fuel gas injectors 13 may be equal to the numbers of cylinders 2 of the ICE 10. The fuel gas injectors 13 are each arranged in fluid communication with the hydrogen fuel line 53 of the fuel system 50.

The fuel system 50 here also comprises a fuel tank 52 containing the hydrogen fuel 51 in gaseous form 51a. The fuel 51 may also be partly arranged in liquid form in the fuel tank 52. The hydrogen gas fuel 51 is supplied to the fuel gas injection 13 of the ICE 10 from the fuel tank 52 via the hydrogen fuel circuit 53 of the fuel system 50. The hydrogen fuel circuit 53 is arranged and configured to contain and transport the hydrogen gas fuel 51, as illustrated by the arrows in FIG. 2, and may optionally include one or more additional fuel system components such as a fuel pump, fuel filter etc. These components are of conventional types and thus not further described herein.

In addition, the ICE 10 comprises an ignition source 30. The ignition source 30 is arranged in the cylinder 2 and at a location facing the combustion chamber 7, as illustrated in FIG. 2. By way of example, the ignition source 30 is arranged at an upper end of the combustion cylinder 7 and spaced apart from the fuel gas injection 13. In FIG. 2, the ignition source 30 is arranged in the cylinder head 14 and offset the fuel injector 13. Other arrangements of the ignition source 30 and the fuel injector 13 are also conceivable.

The ignition source 30 is configured to ignite hydrogen gas jets 51 supplied via the fuel gas injection 13. By way of example, the ignition source 30 is a spark-plug 32. A spark plug is a device for delivering electric current from an ignition system to the combustion chamber of a spark-ignition engine to ignite the compressed fuel/air mixture by an electric spark, while containing combustion pressure within the engine. Typically, in each cylinder 2, there is a corresponding spark plug arranged to ignite a mix of hydrogen gas and oxygen in the cylinder 2. The hydrogen gas fuel is generally compressed to a certain level with air. The compressed air-fuel mixture is thus subsequently ignited by the spark plug 32.

Accordingly, by way of example, the ICE 10 may advantageously be a four-stroke spark-ignition ICE with a hydrogen gas direct injection system. For direct injection systems using the fuel injector 13, as described above, hydrogen gas is mixed with the air after the intake valve 70 has closed.

A hydrogen ICE 12 operable according to a conventional four stroke process performs an intake stroke, a compression stroke, a combustion stroke and an exhaust stroke.

The intake stroke is the stroke of the ICE 10 when the piston moves from the TDC to the BDC, while the intake valve 70 is open, and the exhaust valve 60 is closed. The downward piston motion expands the volume decreasing the pressure in the cylinder. This, together with the charge pressure in the intake port results in a pressure difference over the intake valve 70, which drives the air flow into the cylinder. The compression stroke is the stroke of the ICE 10 when the piston 3 moves from the BDC to the TDC while the piston 3 compresses the air-fuel mixture in preparation for ignition during the power stroke. Both the intake and exhaust valves are typically closed during this stage. The combustion stroke is the stroke of the ICE 10 when the piston 3 moves from the TDC to the BDC. While the piston 3 is near TDC, the compressed air-fuel mixture is ignited by the spark plug 32. The heat released during the subsequent combustion increases the cylinder pressure resulting in a force on the piston 3 which is transferred as a torque to the crank shaft. The exhaust stroke on the other hand is the stroke of the ICE 10 when the piston 3 moves from the BDC to the TDC and combusted exhaust gases are forced out of the cylinder through the exhaust valve 60. In general, the operation of the ICE 10 when operated according to the four-stroke operation corresponds to a repetitive engine operation every second crankshaft 4 revolution.

It may be noted, that before the injection starts the combustion chamber 7 contains primarily air, but some part will be residuals from the preceding combustion stroke. After injection, the combustion chamber contains a combustible mixture, preferable homogenous, of air and hydrogen.

According to one example of the ICE system 100, the controller 90 is configured to control the controllable fuel injector 13 to inject at least one gaseous fuel jet 51 towards the piston bowl 6. The controller 90 is configured to control the controllable fuel injector 13 to inject at least one gaseous fuel jet 51 towards the piston bowl 6 during a fuel injection period occurring prior to an ignition event of the hydrogen gas.

In this context, the fuel injection period is generally defined as a time period when the fuel injector 13 is controlled to inject one or more hydrogen gas jets 51 into the combustion chamber 7. Hence, the term "prior to" here generally refers to a point of time occurring before controlling the ignition source 30 to ignite the hydrogen gas contained in the combustion chamber 7. As such, the ignition event generally refers to the operation of the spark-plug 32 to ignite the hydrogen gas 51 contained in the combustion chamber 7. As the hydrogen gas 51 is blended with air in the combustion chamber 7, it should be readily appreciated that it is the mix of compressed hydrogen gas and compressed air that is ignited by the ignition source 30 (spark plug 32) during the ignition event.

In particular, the controller 90 is configured to control the controllable fuel injector 13 to inject hydrogen gas jets towards a bottom section 11 of the piston bowl 6 during the fuel injection period occurring prior to the ignition event of the hydrogen gas.

Optionally, the fuel injection period is during the compression stroke of the piston. Hence, in one example, the controller 90 is configured to control the controllable fuel injector 13 to inject at least one gaseous fuel jet 51 towards the bottom section 11 of the piston bowl 6 during the fuel injection period when the reciprocating piston 3 moves from BDC to TDC during the compression stroke of the piston 3.

Favourably, the controller 90 is configured to control the controllable fuel injector 13 to inject at least one gaseous fuel jet 51 during the compression stroke when the reciprocating piston 3 travels from BDC to a piston position corresponding to 90 crank angle degrees, CAD, before the TDC.

However, in other examples, the fuel injection period may be initiated by the controllable fuel injector 13 when the piston 3 is at any one of a piston position corresponding to a piston position before BDC during the intake stroke, a piston position at the BDC and a piston position after the BDC during the compression stroke.

The fuel injection period is here terminated by the controllable fuel injector prior to ignition of the hydrogen/air mixture by the spark-plug 32. By way of example, the fuel injector 13 is controlled by the controller 90 to terminate the supply of hydrogen gas by communicating a termination control signal to the actuator of the fuel injector 13.

As mentioned above, the controllable fuel injector 13 can be controlled by the controller in several different manners by various actuators. The controller 90 is generally arranged to control the controllable fuel injector in association with an operating event and/or operational change of the vehicle and the ICE system. Hence, by way of example, the controller 90 is configured to control the controllable fuel injector 13 in response to a control signal.

Optionally, the controller 90 is configured to control the fuel injector 13 in response to a control signal containing data indicative of any one of a hydrogen fuel system pressure, a number of injections per ICE cycle, a timing for start of each injection, a duration of each injection, a separation time between injections.

Optionally, the controllable fuel injector 13 is controllable by the controller 90 to inject at least one gaseous fuel jet in form of an under-expanded jet. In this context, under-expanded jets generally refer to jets issued from the fuel injector during critical flow conditions. That is, a flow condition where the Mach number is equal or higher than 1. The Mach number represents a ratio of fluid velocity to the speed of sound of that fluid at that temperature, i.e., the speed of sound is a thermodynamic property of the gas and varies locally. The very low density of hydrogen gas leads to a speed of sound velocity that is very high, e.g. about 1600 m/s or more. For hydrogen gas jets, critical flow condition is achieved when the pressure ratio over the fuel injector is approximately 1.9. The pressure ratio here refers to the ratio between the pressure upstream the inlet to the fuel injector and the pressure downstream the outlet of the fuel injector.

If the pressure ratio is further increased above the point to reach the sonic level (M=1) for a given fluid temperature, it is possible to increase the Mach number above 1, thus leading to an increase in the velocity of the hydrogen flow, as long as the continuity equation is satisfied, with an additional increment in the mass flow in approximately a linear manner. The Mach number can also be seen as directly proportional to the ratio of the kinetic energy of the flow to its internal energy and as it reaches the value of 1, a discontinuity in the flow properties appears, that is called the shock wave.

In one example, the hydrogen gas jets 51 are injected with a velocity of about 1600 m/s. Other velocities are also conceivable for certain ICE systems.

It should be noted that the fuel injector 13 may generally be controllable by the controller 90 to inject a number of hydrogen gas jets 51 during the fuel injection period, e.g. during the fuel injection period of the compression stroke. By way of example, the fuel injector 13 is controlled by the controller 90 to inject one, two, three, four or even more hydrogen gas jets during the fuel injection period. Favourably, the fuel injector 13 is controlled by the controller 90 to inject two, three or even four hydrogen gas jets in a sequence during the fuel injection period.

It should be noted the fuel injector may also be provided with plenty of orifices, e.g. between 1-8 or even more orifices. In addition, or alternatively, for each of those injector nozzle configurations, it may even be possible to inject fuel more than once during the available fuel injection time-period when injection is possible at critical conditions.

Turning now again to the design of the piston 3 of the ICE system 100. In FIG. 3 there is illustrated one example embodiment of a piston and piston crown that is intended for the hydrogen ICE 10 and ICE system 100, as described above in relation to FIGS. 1 and 2. In particular, FIG. 3 contains an upper top view of the piston top end 16 having a piston bowl 6 according to one example embodiment, a middle perspective view of the piston top end in FIG. 2, and lastly a perspective cross-sectional view of the piston top end 16 in FIG. 2, according to one example embodiment. In the illustrated embodiment, the piston top end 16 forms an integral portion of the piston 3. However, it is also conceivable to provide the piston top end 16 as a separate unit, to be attached to one or more piston base portions, so as to form a complete piston 3. The piston top end 16 generally amounts to the so called piston crown.

FIG. 3 illustrates the piston top end 16 in more detail. The piston bowl 6 is arranged and configured to receive one or more gaseous fuel jets 51 from the fuel injector 3 of the ICE 10. As shown in e.g. FIG. 3, the piston bowl surface 6a faces the combustion chamber 7 when arranged in the ICE 10 as the one exemplified in FIG. 2. Further, the piston bowl 6 comprises the bottom section 11 having a bottom surface 11a.

As illustrated in FIG. 3 and also in FIG. 2, the bottom section 11 may at least partly be defined by the piston bowl surface 6a. The bottom section 11 generally has the bottom section surface 11a being part of the piston bowl surface 6a.

As illustrated in FIG. 2, in conjunction with FIG. 3, the bottom section 11 is here defined by a circumferential side section 20 and the piston bowl surface 11a. Favourably, parts of the side section 20 and the bottom surface 11a together define the piston bowl surface 6a.

The circumferential side section 20 here also extends in the axial direction A. The circumferential side section 20 is the radially outermost part of the piston bowl 6.

The circumferential side section 20 and the bottom surface 11a collectively form the outwardly opening cavity, as illustrated in e.g. FIGS. 2 and 3.

Further, the circumferential side section 20 extends in the axial direction A between the bottom surface 11a of the bottom section 11 and a piston top end surface 5, as illustrated in FIG. 2. The piston top end surface is an upper surface 5 of the piston top end 16. In other words, the piston top end 16 generally comprises the upper surface 5 facing the combustion chamber 7 of the cylinder 2 when the piston is arranged in the cylinder. The upper surface 5 is here the uppermost part of the piston 3.

The bottom section 11 also comprises a protrusion segment 18 configured to guide the one or more gaseous fuel jets. The protrusion segment 18 is here disposed on the bottom surface 11a.

Figure 4:
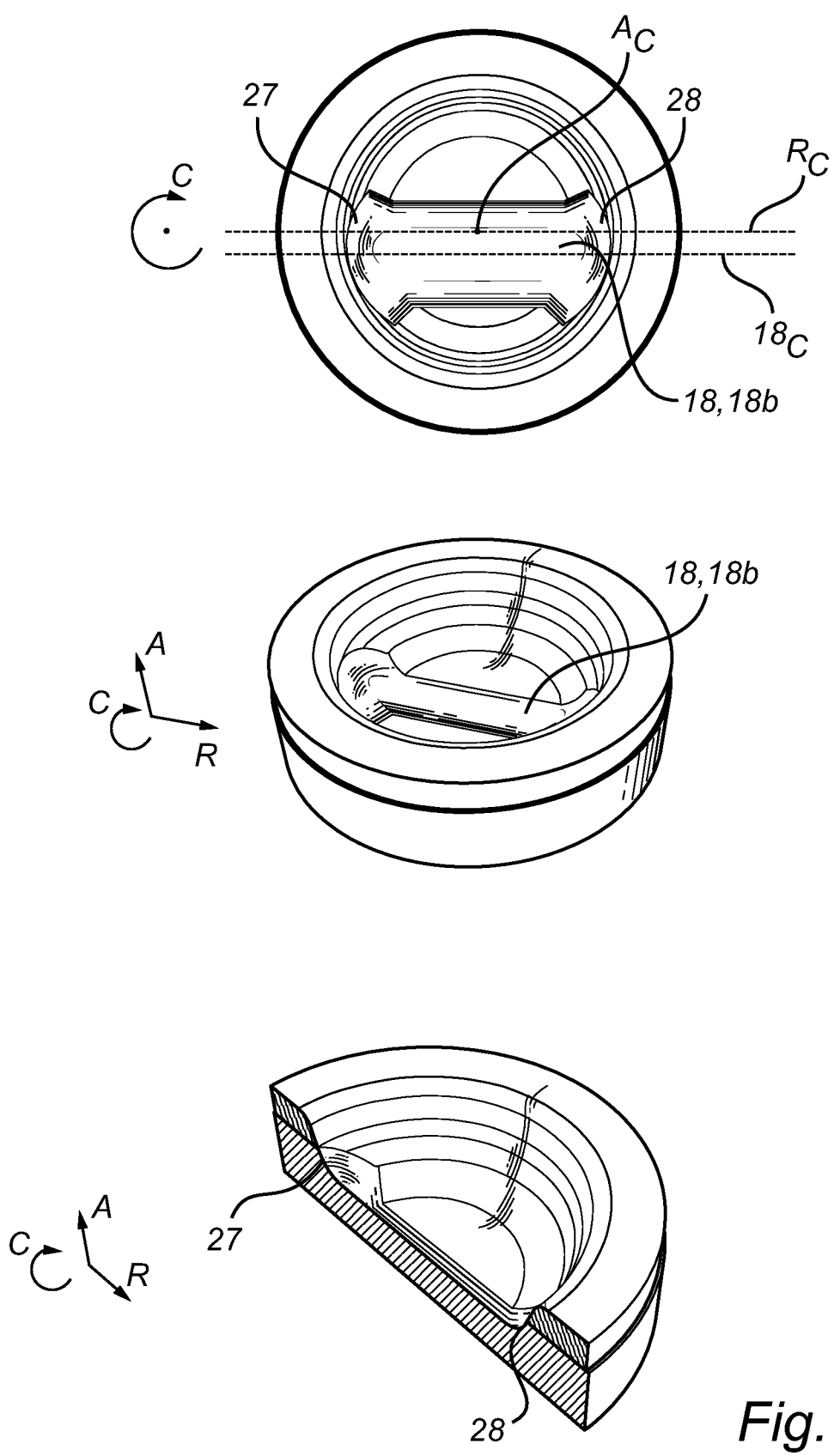
FIG. 4 conceptually illustrate another example embodiment of a piston design for the ICE system, according to the disclosure.

The protrusion segment 18 further extends between spaced apart regions 27, 28 of the circumferential side section 20, as illustrated in FIG. 3. The spaced apart regions 27, 28 of the circumferential side section 20 are typically arranged circumferentially spaced part from each other. In FIG. 3, the spaced apart regions 27, 28 of the circumferential side section 20 are arranged radially opposite each other. However, in other example embodiments, as shown in FIG. 4, the spaced apart regions 27, 28 of the circumferential side section 20 are rather only arranged circumferentially distanced from each other.

The protrusion segment 18 can be provided in several different geometries and shapes. The protrusion segment 18 may also be disposed at various location along the bottom section 11 of the piston bowl 6.

By way of example, the protrusion segment 18 is an essentially straight protrusion segment, as illustrated in FIG. 3.

In FIG. 3, the protrusion segment 18 is a diameter protrusion segment 18a extending through the centre of the piston bowl 6. In particular, the protrusion segment 18 is a diameter protrusion segment 18a extending through the axial centre line $A_c$ of the piston 3.

FIG. 4 illustrates another example of a protrusion segment 18. In FIG. 4, the protrusion segment 18 is a chord protrusion segment 18b arranged offset the centre of the piston bowl. By way of example, the chord protrusion segment 18b is radially offset a radial centre line $R_c$ of the piston bowl 3. The radial centre line $R_c$ extends through the axial centre line $A_c$. In other words, the radial centre line $R_c$ is perpendicular to the axial centre line $A_c$. Hence, if assuming a straight line 18C extending through the middle of the protrusion segment 18b, between the sections 27 and 28, the protrusion segment 18b is disposed in the piston bowl 6 such that the straight line 18C is offset the radial centre line $R_c$ o the piston bowl 3.

In all example embodiments of the protrusion segment 18, as illustrated in e.g. FIG. 3 and also in FIG. 4, the protrusion segment 18 extends a substantial part in the axial direction A. However, the extension of the protrusion segment 18 in the axial direction A may not exceed the piston top end upper surface 5 of the piston 3. Accordingly, the protrusion segment 18 generally extends in the axial direction A between the bottom section 11 and the upper surface 5 of the piston top end 16.

The bottom section 11 may generally have a dome-shaped geometry, at least partly defined by the above surfaces and regions. As may be gleaned from FIG. 3, the bottom section 11 further comprises a floor portion 31. The floor portion 31 is a region of the bottom section 11 that is free from the protrusion segment 18. The floor portion 31 is thus here a part of the bottom surface 11a. The floor portion 31 may generally align with the circumferential side section 20, as illustrated in FIG. 3. The floor portion 31 also extends in-between the protrusion segment 18 and the side section 20.

The protrusion segment is also a single segment in the examples illustrated in FIGS. 3 and 4A to 4C. Besides that the protrusion segment 18 extends between the sections 27 and 28, the protrusion section 18 has a certain axial extension in the axial direction A and a certain circumferential extension along the circumferential direction C.

The arrangement and geometry of the protrusion segment 18 is generally set considering the hydrogen gas fuel injection period and the direction of the fuel injector 13, and thus the direction of the jets 51. In addition, the arrangement and geometry of the protrusion segment 18 is generally set considering start of injection, location and speed of the piston in relation to the injector during the fuel injection. To this end, as non-limiting examples and using FIGS. 5A to 5C for illustrating such examples, hydrogen gas jets injected by the injector will be able to impinge upon the protrusion segment 18, as seen in FIG. 5A, when the piston displaces from its BDC to its TDC during the fuel injection period occurring during the combustion stroke of the piston.

In the embodiment illustrated in FIG. 5A, the protrusion segment 18 is arranged such that hydrogen gas jets 51b is directed towards a region 60 of the protrusion segment 18. In this example, the controllable fuel injector 13 is configured to inject at least one gaseous fuel jet 51b towards the protrusion segment 18, whereby the protrusion segment 18 is arranged and configured to guide the at least one gaseous fuel jet 51b outwardly and toward the circumferential side section 20. In FIG. 5A, there is a single jet structure 51, 51B that during the interaction event is helped to split itself over the protrusion segment 18 and the start flowing towards the bowl circumferential side section 20 and further directed upwards in the axial direction A.

In the embodiment illustrated in FIG. 5B, the protrusion segment 18 is arranged as in FIG. 5A. However, in this example, hydrogen gas jets 51c are directed towards a region 62 on the floor portion 31. Further, the controllable fuel injector 13 is here configured to inject at least one gaseous fuel jet 51c towards the floor portion 31, whereby the floor portion is arranged to guide the jet 51c outwardly and toward the circumferential side section 20. In FIG. 5B, there is generally a two-holes nozzle device (injector) where the jets have been separated from each other upstream the protrusion segment 18. The function of the protrusion segment 18 in FIG. 5B is rather similar to function in FIG. 5A, however, the protrusion segment 18 is now located to interact with the jets on the inner side of each jet.

In the embodiment illustrated in FIG. 5C, the protrusion segment 18 is arranged as in FIG. 5A. However, in this example, hydrogen gas jets 51d are directed towards a region 64 on the side section 20. Further, the controllable fuel injector 13 is here configured to inject jets 51d towards the circumferential side section 20, whereby the circumferential side section 20 is configured to guide at least one gaseous fuel jet inwardly and toward the protrusion segment 18. Due to the arrangement and configuration of the protrusion segment 18, the protrusion segment is positioned so as to further direct the guided jets upwardly along the centre axis $A_c$. In FIG. 5C, there are generally also two jets injected and separated with a larger angle in-between the jets. Due to the combination of the piston bowl shape and the protrusion segment, the piston bowl is adapted to direct at least the inner part of the flow, or most of the flow towards the protrusion segment 18. The protrusion segment is now generally used and arranged to support the inner flow to change direction upwards in the axial direction A. FIG. 5C is thus a slightly different way to use the protrusion segment 18 than the protrusion segment 18 in FIGS. 5A and 5B.

Accordingly, the controllable fuel injector 13 is controlled by the controller 90 to inject one or more hydrogen gas jets 51 towards the protrusion segment 18. In addition, by the arrangement of the protrusion segment 18 and the control of the fuel injector 13, as mentioned above, the protrusion segment 18 is capable of guiding hydrogen gas jets within the combustion chamber 7 so as to enhance mixing of hydrogen and air.

It should also be noted that the above different ways of injecting hydrogen gas jets towards the protrusion segment 18 and the regions 62 and 64 of the floor portion and the side section, respectively, can be combined during one fuel injection period. This is particularly useful for low pressure direct injected hydrogen ICE systems and can occur because, geometrically, the interaction between jet(s) and the piston bowl will change during the fuel injection period since the piston will change position during the injection. In comparison with e.g. diesel ICE system, where the time period for injection of diesel is generally shorter, a hydrogen ICE system 100 operating during low pressure direct injection conditions may favourably combine the options of injecting hydrogen gas jets towards the protrusion segment 18 and the regions 62 and 64 of the floor portion and the side section, respectively, during one fuel injection period. This is at least partly due to that the injection of hydrogen gas jets is performed during a longer period of time. Favourably, the fuel injection period for hydrogen ICE system 100 occurs when the piston 3 moves from BDC to TDC during the compression stroke of the piston 3. Other alternatives are also possible, as mentioned herein.

In other words, the above configurations of injecting gaseous fuel jet(s) during the fuel period may be combined during one fuel injection period where the piston reciprocates within the cylinder. In other words, the controllable fuel injector is also configured to inject, during the fuel injection period, one or more gaseous fuel jets towards the protrusion segment 18 at a first piston position and one or more gaseous fuel jets towards the circumferential side section 20 at a second piston position. It should be noted that he first and second piston positions refer to two different piston positions as the piston reciprocates within the cylinder during the fuel injection period.

Furthermore, the controller 90 is generally configured to operate the ICE system 100 according to the following method and sequences. The controller 90 operates according to a method 300 for controlling the ICE system 100, as described above in relation to FIGS. 1, 2 and e.g. 3. The method is generally performed by the controller 90 during operation of the ICE system 100. By way of example, the method comprises a step of controlling the fuel injector 13 to inject one or more gaseous fuel jets 51 towards the bottom section 11 of the piston bowl 6 during a fuel injection period occurring prior to an ignition event of the hydrogen gas. Optionally, the method comprises the initial step of monitoring the position of the piston in the cylinder. By way of example, the ICE system is operable to detect the position of the piston in the cylinder. Typically, the position of the piston may be determined by a flywheel position sensor, as is commonly used in the field of ICE systems. To this end, the fuel injection period may typically be determined and/or adjusted in response to the detected position of the piston in the cylinder. The flywheel position sensor may be arranged in communication with the control unit of the ICE system and/or the vehicle.

Typically, the method may further comprise closing the intake valve(s) to form a closed combustion chamber in relation to an intake conduit. The method then comprising injecting one or more gaseous fuel jets during the fuel injection period occurring prior to the ignition event of the gaseous fuel. Further, the method here comprises the step of terminating the injection of one or more gaseous fuel jets 51 prior to controlling the ignition source to ignite the supplied hydrogen gas within the combustion chamber.

Finally, the method generally comprising igniting the injected gaseous fuel contained in the combustion chamber by the ignition source.

The controller 90 is here arranged in communication with the fuel injector 13. The controller generally comprises a processing circuitry. The controller 90 may be connected to the fuel injector 13 by wire or in a wireless fashion. The fuel injector 13 may include a corresponding controller (not illustrated) with a processing circuitry configured to receive instructions from the controller 90. In addition, or alternatively, the controller 90 may be arranged in communication with the fuel injector 13 so as to control the fuel injector by controlling an actuator of the fuel injection 13, as mentioned above. The actuator is generally arranged in communication with the controller 90. The controller 90 is configured to control the operation of the fuel injector 13, as mentioned above.

By way of example, the controllable fuel injector 13 is controllable by the controller 90 to inject hydrogen gas into the combustion chamber 7 with a low injection pressure of up to about 60 bar. Moreover, the controller 90 is typically configured to control the fuel injector 13 in response to the control signal. The control signal can include different types of data and instructions for the fuel injectors 13. By way of example, the control signal contains data indicative of a hydrogen system pressure, a number of injections per engine cycle, a timing for start of each injection, a duration of each injection, a separation time between injections. By way of example, the controller 90 is arranged and configured to inject hydrogen gas directly into the cylinder during the compression stroke. In addition, the fuel injection is generally controlled to occur when the intake valves are completely closed.

In addition, the controllable fuel injector 13 may be configured to inject at least one gaseous fuel jet towards the protrusion segment 18, whereby the protrusion segment 18 is configured to guide the at least one gaseous fuel outwardly and toward the circumferential side section.

In addition, or alternatively, the controllable fuel injector 13 may be configured to inject at least one gaseous fuel jet towards the circumferential side section 20, whereby the circumferential side section 20 is configured to guide at least one gaseous fuel jet inwardly and toward the protrusion segment 18 and the protrusion segment being capable of directing the guided gaseous fuel jet upwardly along the center axis Ac.

The controller 90 may include a microprocessor, microcontroller, programmable digital signal processor or another programmable device. Thus, the controller typically comprises electronic circuits and connections as well as processing circuitry such that the controller can communicate with different parts of the ICE system such as the ICE, the fuel injector and the ignition source or any other component of the vehicle, such as the clutch, the gear box and/or any other parts in need of being operated in order to provide the functions of the example embodiments. Typically, the controller may also be configured to communicate with other parts of the vehicle such as the brakes, suspension, and electrical auxiliary devices, e.g. the air conditioning system, in order to operate the vehicle according to the driver's needs. The controller may comprise modules in either hardware or software, or partially in hardware or software and communicate using known transmission buses such as CAN-bus and/or wireless communication capabilities. The processing circuitry may be a general purpose processor or a specific processor. The controller typically comprises a non-transitory memory for storing computer program code and data upon. Thus, the control unit may be embodied by many different constructions.

The controller 90 include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The present disclosure also relates to an ICE system in the form of a hydrogen internal combustion engine, as described herein. The internal combustion engine may be a low pressure direct injection fuel gas ICE. The present disclosure further relates to a vehicle comprising the hydrogen ICE system, as described herein.

Even though the disclosure has been described with reference to specific exemplifying embodiments thereof, many different alterations, modifications and the like will become apparent for those skilled in the art. Accordingly, it is to be understood that the present disclosure is not limited to the embodiments described above and illustrated in the drawings; rather, the skilled person will recognize that many changes and modifications may be made within the scope of the appended claims.

The invention claimed is:

1. A piston for an internal combustion engine (ICE), operable on a gaseous fuel, said piston having a piston top end comprising a piston bowl for receiving at least one gaseous fuel jet from a fuel injector of the ICE, said piston bowl having a bottom section and a circumferential side section extending in an axial direction between the bottom section and a piston top end surface, wherein said bottom section comprises a protrusion segment configured to guide said at least one gaseous fuel jet, wherein said protrusion segment further extends between spaced apart regions of the circumferential side section, and wherein the extension of the protrusion segment in the axial direction does not exceed the piston top end upper surface of the piston, as defined by the circumferential side section.

2. The piston according to claim 1, wherein said protrusion segment is a straight protrusion segment.

3. The piston according to claim 1, wherein said protrusion segment is a diameter protrusion segment extending through a centre of the piston bowl.

4. The piston according to claim 1, wherein said protrusion segment is a chord protrusion segment being arranged offset the centre of the piston bowl.

5. The ICE system according to claim 1, wherein said controllable fuel injector is controllable by the controller to inject gaseous fuel into the combustion chamber with a velocity of up to about 1600 m/s.

6. An internal combustion engine (ICE), system comprising:

an internal combustion engine for combustion of gaseous fuel and having a combustion chamber at least partially delimited by a cylinder;

a piston having a piston top end comprising a piston bowl for receiving at least one gaseous fuel jet from a fuel injector of the ICE, said piston bowl having a bottom section and a circumferential side section extending in an axial direction between the bottom section and a piston top end surface, wherein said bottom section comprises a protrusion segment configured to guide said at least one gaseous fuel jet, wherein said protrusion segment further extends between spaced apart regions of the circumferential side section, and wherein the extension of the protrusion segment in the axial direction does not exceed the piston top end upper surface of the piston, as defined by the circumferential side section, wherein said piston is moveable within said cylinder between a bottom dead centre (BDC) and a top dead centre (TDC), said piston bowl being intended to form part of the combustion chamber;

a controllable fuel injector arranged to inject gaseous fuel into the combustion chamber and towards the piston bowl; and a controller configured to control the controllable fuel injector to inject at least one gaseous fuel jet towards the bottom section of the piston bowl during a fuel injection period occurring prior to an ignition event of the gaseous fuel.

7. The ICE system according to claim 6, wherein said controller is configured to control the controllable fuel injector to inject at least one gaseous fuel jet towards the bottom section of the piston bowl during the fuel injection period when said reciprocating piston moves from BDC to TDC during a compression stroke.

8. The ICE system according to claim 7, wherein said controller is configured to control the controllable fuel injector to inject at least one gaseous fuel jet during the compression stroke when the reciprocating piston travels from BDC to a piston position corresponding to 90 crank angle degrees (CAD), before the TDC.

9. The ICE system according to claim 6, wherein said controllable fuel injection period is initiated by the controllable fuel injector when the piston is at any one of a position being a piston position before BDC during an intake stroke, a piston position at the BDC and a piston position after the BDC during the compression stroke.

10. The ICE system according to claim 6, wherein said controllable fuel injector is configured to inject at least one gaseous fuel jet towards said protrusion segment, whereby said protrusion segment is configured to guide said at least one gaseous fuel outwardly and towards said circumferential side section.

11. The ICE system according to claim 6, wherein said controllable fuel injector is configured to inject at least one gaseous fuel jet towards said circumferential side section, whereby said circumferential side section is configured to guide at least one gaseous fuel jet inwardly and towards said protrusion segment.

12. The ICE system according to claim 6, wherein the controller is configured to control the controllable fuel injector in response to a control signal.

13. The ICE system according to claim 6, wherein said internal combustion engine further comprises an ignition source comprising a spark plug for igniting the gaseous fuel.

14. The ICE system according to claim 6, wherein said fuel injection period is terminated by the controllable fuel injector prior to ignition of the fuel by the ignition source.

15. The ICE system according to claim 6, wherein said controllable fuel injector is controllable by the controller to inject the at least one gaseous fuel jet in form of an under-expanded jet.

16. The ICE system according to claim 7, wherein said controllable fuel injector is controllable by the controller to inject a number of gaseous fuel jets during said compression stroke.

17. The ICE system according to claim 6, wherein the controllable fuel injector comprises a nozzle device configured to form the at least one gaseous fuel jet from a gaseous fuel delivered to the fuel injector from a fluid conduit.

18. The ICE system according to claim 17, wherein the nozzle device comprises a cap device arranged at an end of the nozzle device, said cap device having at least one orifice for directing the at least one gaseous fuel jet towards the piston bowl.

19. The ICE system according to claim 6, wherein said internal combustion engine is a low pressure direct injection fuel gas ICE.

20. The ICE system according to claim 19, wherein said controllable fuel injector is controllable by the controller to inject gaseous fuel into the combustion chamber with a low injection pressure of not more than about 60 bar.

21. The ICE system according to claim 6, wherein the fuel is hydrogen.

22. A vehicle comprising a piston having a piston top end comprising a piston bowl for receiving at least one gaseous fuel jet from a fuel injector of the ICE, said piston bowl having a bottom section and a circumferential side section extending in an axial direction between the bottom section and a piston top end surface, wherein said bottom section comprises a protrusion segment configured to guide said at least one gaseous fuel jet, wherein said protrusion segment further extends between spaced apart regions of the circumferential side section, and wherein the extension of the protrusion segment in the axial direction does not exceed the piston top end upper surface of the piston, as defined by the circumferential side section.

* * * * *